(12) United States Patent
Simnacher (10) Patent No.: US 8,143,740 B1
(45) Date of Patent: Mar. 27, 2012

(54) APPARATUS FOR STORING AND USING WIND ENERGY

(76) Inventor: Larry W. Simnacher, Bay City, TX (US)

(*) Notice: Subject to any disclaimer, the term of this patent is extended or adjusted under 35 U.S.C. 154(b) by 603 days.

(21) Appl. No.: 12/370,452

(22) Filed: Feb. 12, 2009

(51) Int. Cl.
*F03B 17/00* (2006.01)
*F03B 9/00* (2006.01)
*F03B 13/00* (2006.01)
*H02P 9/04* (2006.01)
*F03D 9/00* (2006.01)

(52) U.S. Cl. ......... 290/55; 290/44; 416/131; 416/132 R; 416/132 B (58) Field of Classification Search .............. 416/131, 416/132 R, 132 B; 290/44, 55
See application file for complete search history.

(56) References Cited

U.S. PATENT DOCUMENTS

| | | | |
|---|---|---|---|
| 124,843 A | 3/1872 | Millard | |
| 512,352 A | 1/1894 | Zwiebel | |
| 3,487,228 A | 12/1969 | Kriegel | |
| 3,945,755 A | 3/1976 | Gentile | |
| 4,151,719 A | 5/1979 | Boots | |
| 4,159,427 A | 6/1979 | Wiedemann | |
| 4,201,059 A | 5/1980 | Feder | |
| 4,206,608 A | 6/1980 | Bell | |
| 4,321,475 A | 3/1982 | Grub | |
| 4,495,424 A | 1/1985 | Jost | |
| 4,514,977 A | 5/1985 | Bowen | |
| 4,757,211 A | 7/1988 | Kristensen | |
| 5,905,312 A * | 5/1999 | Liou | 290/54 |
| 6,100,600 A | 8/2000 | Pflanz | |
| 6,359,347 B1 | 3/2002 | Wolf | |
| 6,420,794 B1 | 7/2002 | Cao | |
| 6,445,078 B1 * | 9/2002 | Cieslak, Jr. | 290/1 R |
| 6,672,054 B2 * | 1/2004 | Merswolke et al. | 60/398 |
| 6,766,643 B2 | 7/2004 | Christensen | |
| 6,911,741 B2 * | 6/2005 | Pettersen et al. | 290/44 |
| 7,183,664 B2 * | 2/2007 | McClintic | 290/55 |
| 7,956,485 B1 * | 6/2011 | Simnacher | 290/55 |
| 8,030,790 B2 * | 10/2011 | Kamenov | 290/43 |

* cited by examiner

*Primary Examiner* — Jerome Jackson, Jr.
*Assistant Examiner* — David Spalla
(74) *Attorney, Agent, or Firm* — Egbert Law Offices PLLC (57) ABSTRACT

An apparatus for storing and using wind energy has a hub, blades extending radially outwardly from the hub, a shaft interconnected to the hub, a generator connected to the shaft, a first coupler for coupling and decoupling the shaft from the hub, a first tank having an inlet and an outlet, a second tank having an inlet and an outlet, a line connecting the first tank and the second tank, a second coupler for coupling and decoupling the shaft from the line, an elevated reservoir having a first discharge port and a second discharge port, a base reservoir having a first receiver port and a second receiver port, a pump for pumping a fluid from the base reservoir to the elevated reservoir, a transmission interconnected to the shaft between the line and the generator, and a sheave positioned on a side of the transmission opposite the shaft.

20 Claims, 4 Drawing Sheets

APPARATUS FOR STORING AND USING WIND ENERGY

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to apparatus for storing energy produced by wind energy generators. More particularly, the present invention relates to apparatus for using energy produced by wind energy generators. More particularly, the present invention relates to the action of gravity and the flowing of fluid for the storage of energy during non-peak wind conditions.

2. Description of Related Art Including Information Disclosed Under 37 CFR 1.97 and 37 CFR 1.98.

Wind energy is a prime source of non-polluting renewable energy that is available to the world population. Typically, wind turbines operate by the rotation of propellers and/or blades as caused by the action of wind blowing thereacross. As wind blows at a given velocity, the blades of the turbine rotate so as to rotate a shaft of a generator so as to generate electricity. The amount of electricity generated will depend upon the strength of the wind that is blowing across the blades.

One of the main problems with wind energy as a resource for the production of electricity is that wind is not constant. When wind blows below a certain velocity, the blades do not rotate and no energy is be generated. This is particularly the case at nighttime hours when the wind is not blowing. As a result, it is possible that no energy is produced during non-peak hours even though demand for energy still exists during non-peak hours. Thus, there is a need to be able to effectively store at least some of the energy that is produced during peak conditions for use during non-peak conditions.

In order to have an effective wind energy storage apparatus, it is important that the storing of electricity not require more energy than was produced by the wind energy generator during peak operating conditions. It is possible to use batteries for storing energy. Unfortunately, batteries are costly and can be extremely heavy for the amounts of energy needed to be stored for use during non-peak hours. Moreover, batteries lose their ability to adequately recharge over time and must be replaced, which adds to the cost of using batteries for the present goal. As such, a need has developed in order to produce a system whereby wind energy can be cheaply stored during peak wind conditions for use during non-peak wind conditions.

In the past, various U.S. patents have issued relating to the use of fluids for the storage of wind energy. For example, U.S. Pat. No. 512,352, issued on Jan. 9, 1894 to Zwiebel, discloses a wind mill attached to a pair of bucket elevators. When wind blows, the windmill turns one of the bucket elevators so as to lift sand from a lower compartment to an upper compartment. When the windmill does not turn, a chute is opened so as to allow sand from the upper compartment to travel into the buckets of the other bucket elevator so as to cause the buckets to return the sand to the lower compartment. The turning of the other bucket elevator by the weight of the falling sand creates work for use while the windmill is not turning.

U.S. Pat. No. 124,843, issued on Mar. 19, 1872 to Millard, discloses a hydraulic motor that has pulleys, a continuous chain wrapped around the pulleys, buckets attached along the length of the continuous chain, a first tube in which the buckets travel downwardly through as they are filled with water, and a second tube fluidly connected to the first tube so as to supply the buckets within the first tube with water. The continuous chain contracts upon a decrease in temperature and expands upon an increase in temperature.

U.S. Pat. No. 4,151,719, issued May 1, 1979 to Boots, discloses a water motor that has an endless series of buckets arranged for movement about a generally rectangular path of travel to present an uppermost, horizontal, loading flight whereby each bucket may be completely filled with water from an overlying basin prior to its descent along a vertical power flight of the motor. The buckets are pivotally supported for free swinging movement. A trip mechanism adjacent the lowermost end of the power flight individually empties the buckets at the end of their descent. A water outlet in the overlying basin extends longitudinally along the full length of the loading flight and has a baffle for controlling the flow of water to the buckets. A pair of endless roller chains secured at opposite ends of the respective buckets are operably coupled with an output shaft for powered rotation of the latter in response to movement of the buckets along their rectangular path of travel.

U.S. Pat. No. 3,945,755, issued on Mar. 23, 1976 to Gentile, discloses an apparatus for transmitting torque to a load. The apparatus includes a pair of pulleys vertically spaced apart by a great distance for movably mounting a long endless belt in a substantially vertical disposition so as to move the belt freely in a closed loop path. Spaced-apart arm devices connect to and extend from the belt. Weights are carried by the arm devices. The weights and the arm devices are arranged in pairs. Each one of the pairs provides a larger moment acting through the belt on at least one of the pulleys when falling vertically downwardly under the force of gravity. Conversely, each of the pairs provides a relatively smaller opposing moment acting through the belt on at least one of the pulleys when being pulled vertically upwardly by the belt. The torque is transmitted from at least one of the pulleys for driving the load.

U.S. Pat. No. 5,905,312, issued on May 18, 1999 to Liou, discloses a system for generating electricity by gravity. The system includes tanks mounted on a circulating device. When the tanks receive a working medium descending from a higher place by gravity, the circulating device is driven to circulate along a guiding device so as to drive a working shaft of a generator for generating electricity. A transmission mechanism is added between the circulating device and the working shaft to increase the rotational speed of the working shaft.

U.S. Pat. No. 4,757,211, issued on Jul. 12, 1988 to Kristensen, discloses a machine for generating electricity that has housing, a hub shaft positioned within the housing, blades connected to a front of the hub shaft, and a gear box positioned immediately behind the hub shaft. The housing is specially formed with a tapered part and a cylindrical part. The body has a front end that faces upwind. Bolt holes and flanges are positioned for optimum energy generation.

U.S. Pat. No. 4,201,059, issued on May 6, 1980 to Feder, discloses an arrangement of constructed elements used for the conversion of fluctuating natural energy and generation of constant rotary speed of a power-producing machine or motor, electric or otherwise, by way of free-falling masses in the place of commonly used regulators or governors. With this arrangement, the invention realizes a transmission for which, in contrast to known transmissions, the output speed is constant regardless of the input speed so long as the input torque is equal to or greater than the output torque.

U.S. Pat. No. 3,487,228, issued on Dec. 30, 1969 to B. Kriegel, discloses a power generating apparatus in which water is allowed to fall from an elevated position to a lower position for the movement of a piston associated with the generation of energy. A suitable pump is connected thereto so as to cause the liquid to rise after fallen by gravity.

U.S. Pat. No. 4,159,427, issued on Jun. 26, 1979 to H. O. Wiedemann, discloses an apparatus for utilizing natural energies. The energy extracting and storing equipment is installed in a floating vessel or raft. The energy storing equipment includes flywheel-type roller or cylinders driven by electric motors energized by electric generators which, in turn, receive the energy from the energy extracting equipment.

U.S. Pat. No. 4,206,608, issued on Jun. 10, 1980 to T. J. Bell, discloses a natural energy conversion, storage and electricity generation system. The natural energy is utilized to pressurize hydraulic fluid. The hydraulic fluid is temporarily stored within the high pressure storage tanks to be utilized in the production of electricity. Excess electricity which is generated by hydroelectric devices by the pressurized hydraulic fluid is utilized to pressurize additional hydraulic fluid. The additional hydraulic fluid is then supplied to the high pressure storage tanks to be used at a later time for the production of electricity. The high pressure storage tanks are initially charged with a compressible fluid which is compressed by the pressurized hydraulic fluid.

U.S. Pat. No. 4,321,475, issued on Mar. 23, 1982 to R. Grub, discloses a hydro-electric generating arrangement which includes a container that is situated below the upper level of a body of water and has an inlet and an outlet. The water from the body of water is admitted into the receiving space bounded by the container through the inlet, and drives a turbine. The water is pumped out of the receiving space through an outlet by energy derived by the force of wind or by excess electric energy derived from an electric distribution network during off-peak periods.

U.S. Pat. No. 4,495,424, issued on Jan. 22, 1985 to B. Jost, discloses a plant for the utilization of wind and waves. Fluid flow engines utilize both wind energy and wave energy for generating power therefrom. Each engine includes blades for making use of the energy of the wind. The engines operate a common turbogenerator. A low-loss power transmission is provided for transmitting power generated by the engines to the turbogenerator. This low-loss power transmission includes a pressure vessel adapted to store water under pressure to drive the turbogenerator, a conduit to pass the water under pressure to the vessel, and a pump driven by the engines to draw in the water from a water source and to deliver it through the conduit to the vessel.

U.S. Pat. No. 4,514,977, issued on May 7, 1985 to C. W. Bowen, discloses a water lift system that includes a vacuum pump attached to the top of an enclosed tank situated above a lower liquid level. A vacuum pump is utilized sequentially to draw liquid from the lower level and thereafter drain the tank for use in a low head turbine generator.

U.S. Pat. No. 6,100,600, issued on Aug. 8, 2000 to T. Pflanz, discloses a maritime power plant system with processes for storing, producing and consuming regenerative energy. The regenerative energy sources are ocean water, ocean waves, wind and solar radiation.

U.S. Pat. No. 6,359,347, issued on Mar. 19, 2000 to A. M. Wolf, discloses a siphon hydroelectric generator for generating hydroelectric power from a water source by lift water from a relatively low position to a second relatively raised position. The water is moved in a generally upward direction stepwise from a lowermost tier to an uppermost tier in a plurality of stacked tiers. The water from the water source is initially upwardly siphoned to the lowermost tier. The water from the uppermost tier is channeled down to turn a turbine-driven generator to produce electrical power.

U.S. Pat. No. 6,420,794, issued on Jul. 16, 2002 to T. D. Cao, discloses a hydropower conversion system for circulation of water between a delivering reservoir and a receiving reservoir through hydro-turbines, pumps and backup reservoirs. Water in the delivering reservoirs maintained at a constant functioning level by an adjusting valve linked with a valve control mechanism to adjust the opening and closing of passages conducting water flowing from the back-up reservoir into the delivering reservoirs. Outlets allow excess water to flow out of the back-up reservoir back down to the receiving reservoir.

U.S. Pat. No. 6,766,643, issued on Jul. 27, 2004 to H. F. Christensen, discloses a wind and wave energy plant that includes a windmill with a rotor and a wave actuated water pump that can drive a turbine whose output shaft is connected with an electric generator. The windmill includes a tubular mill tower which is firmly anchored to the seabed and encloses a storage tank between the sea surface and the mill rotor. The tank is filled with water by means of a pump by way of a non-return valve. The water is then lead to the turbine.

It is an object of the present invention to provide an apparatus that effectively stores converts wind energy to electrical energy during peak wind conditions.

It is another object of the present invention to convert electrical energy to potential energy of a fluid during peak wind conditions.

It is another object of the present invention to convert potential energy of a fluid to electrical energy during non-peak wind conditions.

It is still another object of the present invention to provide an apparatus whereby the rotor of the generator of a wind turbine can be rotated in the absence of wind.

It is another object of the present invention to provide an apparatus that utilizes fluids for the storage of wind energy as potential energy.

It is still another object of the present invention to provide an apparatus that can operate as a closed loop system for the transport of liquids so as to store and use energy.

These and other objects and advantages of the present invention will become apparent from the reading of the attached specification and appended claims.

BRIEF SUMMARY OF THE INVENTION

The present invention is an apparatus for storing and using wind energy comprising a hub, a plurality of blades extending radially outwardly from the hub, a shaft interconnected to the hub, a generator connected to the shaft, a first coupling means for coupling and decoupling the shaft from the hub, a first tank having an inlet and an outlet, a second tank having an inlet and an outlet, a line connecting the first tank and the second tank, a second coupling means for coupling and decoupling the shaft from the line, an elevated reservoir having a first discharge port and a second discharge port, a base reservoir having a first receiver port and a second receiver port, a pumping means for pumping a fluid from the base reservoir to the elevated reservoir, a transmission interconnected to the shaft between the line and the generator, and a sheave positioned on a side of the transmission opposite the shaft, the line extending around the sheave.

The shaft extends through the generator and outwardly of an end of the generator opposite the hub. Each of the first and second tanks is movable between an upper position and a lower position. The first tank is in the upper position when the second tank is in the lower position. The second tank is in the upper position when the first tank is in the lower position. The first coupling means is positioned between the shaft and the hub. The second coupling means is positioned between the shaft and the first and second tanks. The pumping means is electrically connected to the generator. The first receiver port is connected to the outlet of the first tank when the first tank is in the lower position. The second receiver port is connected to the outlet of the second tank when the second tank is in the lower position. The first discharge port is connected to the inlet of the first tank when the first tank is in the upper position. The second discharge port is connected to the inlet of the second tank when the second tank is in the upper position. The line is interconnected to the shaft.

Each of the first and second coupling means has a coupled position and a decoupled position. The first coupling means is in the coupled position when the second coupling means is in the decoupled position. The first coupling means is in the decoupled position when the second coupling means is in the coupled position. The first coupling means comprises a first member connected to the hub, and a second member connected to the shaft. The first member and second member are in the coupled position when the plurality of blades and the hub rotate. The first member and the second member are in the decoupled position when the plurality of blades and the hub are stationary. The second coupling means is a clutch operatively connected to the transmission. The clutch is in the decoupled position when the plurality of blades and the hub rotate. The clutch is in the coupled position when the plurality of blades and the hub are stationary.

The apparatus further comprises a pipe that connects the base reservoir with the elevated reservoir. The pumping means pumps the fluid through the pipe from the base reservoir to the elevated reservoir. The pipe comprises a first pipe connecting the first base reservoir with the elevated reservoir, and a second pipe connected the second base reservoir with the elevated reservoir. The pumping means comprises a first pump positioned between the first base reservoir and the first pipe, and a second pump positioned between the second base reservoir and the second pipe.

The base reservoir comprises a first base reservoir, a second base reservoir, a first discharge station elevated above the first base reservoir, a second discharge station elevated above the second base reservoir, a first conduit connecting the base reservoir and the first discharge station, and a second conduit connecting the base reservoir and the second discharge station. The first receiver port is located on the first discharge station. The second receiver port is located on the second discharge station.

The first pipe has a one-way valve positioned therein. The second pipe has a one-way valve positioned therein. The first discharge station is positioned below the first tank. The second discharge station is positioned below the second tank. The first tank discharges liquid from an interior volume when in the lower position. The second tank discharges liquid from an interior volume when in the lower position. The outlet of the first tank engages the first receiver port of the first discharge station when in the lower position. The outlet of the second tank engages the second receiver port of the second discharge station when in the lower position. The first discharge station is elevated above the first base reservoir. The second discharge station is elevated above the second base reservoir. The first base reservoir is elevated below the elevated reservoir. The second base reservoir is elevated below the elevated reservoir. The transmission is a variable-drive transmission.

The apparatus further comprises a locking means for preventing a rotation of the line around the sheave when the first coupling means is in the coupled position and the second coupling means is in the decoupled position, and a sensor means for detecting a rotation of the plurality of blades and the hub. The sensor means is operatively connected to the locking means. The locking means is positioned between the second coupling means and the sheave. The locking means has a locked position and an unlocked position. The locking means moves from the unlocked position to the locked position after the sensor means detects the rotation of the plurality of blades and the hub. The sensor means is operably connected to the first and second coupling means. The sensor means sends a signal to the first and second coupling means upon detecting a rotation of the blades. A controlling means is operably connected to the first coupling means and to the second coupling means and to the locking means. The controlling means controls the first coupling means and the second coupling means and the locking means. The controlling means can also be operably connected to the sensor means. The controlling means communicates with the sensor means.

DETAILED DESCRIPTION OF THE INVENTION

Figure 1:
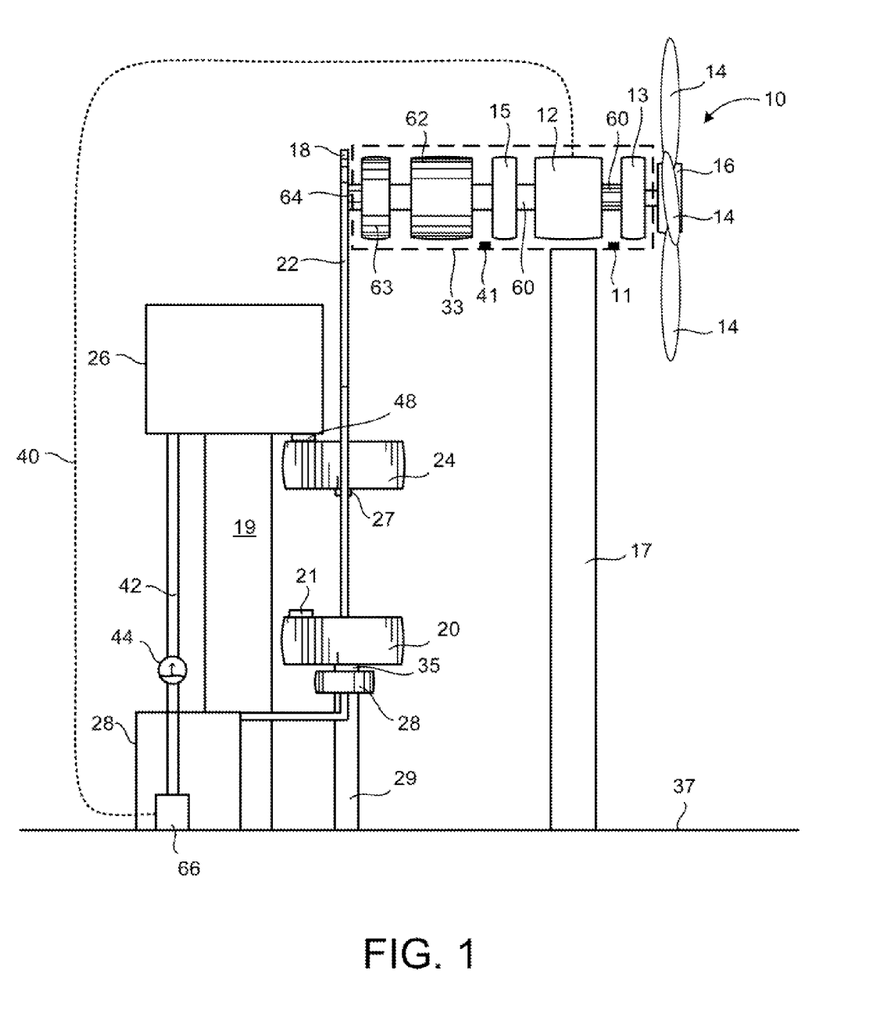
FIG. 1 shows a side elevational view of the preferred embodiment of the apparatus of the present invention, with the first tank in the lower position and the second tank in the upper position.

Referring to FIG. 1, there is shown a side elevational view of the preferred embodiment of the apparatus 10 for storing and using wind energy in accordance with the teachings of the present invention. The apparatus 10 includes a hub 16, and a plurality blades 14 radiating outwardly from the hub 16. In the preferred embodiment, the apparatus 10 has three blades 14. The hub 16 is interconnected to a sheave 18. A shaft 60 is interconnected to the hub 16. A generator 12 is connected to the shaft 60. The generator 12 can be a typical generator with a rotor and stator, where either the rotor or the stator is positioned on the shaft 60 so that the rotor rotates relative to the stator, or vice versa. The shaft 60 extends through the generator 12 so that the shaft 60 extends outwardly of the end of the generator 12 opposite the hub 16. The blades 14, shaft 60, hub 16, and generator 12 are similar to the components of a typical wind turbine, where wind rotates the blades attached to a hub, and the hub rotates a shaft about its longitudinal axis that is connected to a generator. The generator has either a rotor or stator operatively connected with the shaft that rotates relative to the corresponding stator or rotor so as to generate electricity.

In the present invention, the shaft 60 extends completely through the generator 12 so that the shaft 60 can be turned by power sources from either side of the generator 12. A first coupling means 13 is positioned between the shaft 60 and the hub 16. The first coupling means 13 couples and decouples the shaft 60 from the hub 16 so that the shaft 60 can rotate independently of the hub 16 when decoupled and so that the shaft 60 can rotate with the hub 16 when coupled. A second coupling means 15 is positioned adjacent the shaft 60. The second coupling means 15 decouples the shaft 60 from the line 22. The second coupling means 15 can be a typical clutch. A transmission 62 is interconnected to the shaft 60 between the line 22 and the generator 12. More particularly, the transmission 62 is positioned between the second coupling means 15 and the line 22. The transmission 62 is a variable-speed transmission. The second coupling means 15 can be a clutch of the transmission 62. A locking means 63 is placed between the second coupling means 15 and the sheave 18. More particularly, the locking means 63 is placed between the transmission 62 and the sheave 18. The locking means 63 prevents a rotation of the line 22 around the sheave 18 when the first coupling means 13 is in the coupled position and the second coupling means 15 is in the decoupled position. A housing 33 can be used to house the shaft 60, first and second coupling means 13 and 15, the generator 12, the transmission 62, and the locking means 63 so as to protect these components from the weather. The housing 33 is shown by a dashed line 33 in FIG. 1. The housing 33 and its contents are supported by structural member 17, which extends upwardly from the ground 37. A sensor means 11 is placed adjacent the housing 33 so as to detect a rotation of the blades 14 and the hub 16. The sensor means 11 is operatively connected to the locking means 63. The sensor means 11 can also be operatively connected to the first and second coupling means 13 and 15. The locking means 63 goes into a locked position when the sensor means 11 senses rotation of the blades 14. The locking means 63 goes into an unlocked position when the sensor means 11 senses that the blades 14 are stationary.

A first tank 20 has an inlet 21 and an outlet. The outlet of the first tank 20 cannot be seen in FIG. 1 because the outlet of the first tank 20 is received within the first receiver port 35 of the base reservoir 28. A second tank 24 has an inlet and an outlet 27. The inlet of the second tank 24 cannot be seen in FIG. 1 because inlet of the second tank 24 is received within the second discharge port 48. Each tank 20 and 24 has an upper position and a lower position. In FIG. 1, the first tank 20 is in the lower position, and the second tank 24 is in the upper position. The first tank 20 is connected by line 22 to a second tank 24. The first and second tanks 20 and 24 are connected to opposite ends of line 22. The line 22 extends over a sheave 18 so that when the first tank 20 moves upwards, the second tank 24 moves downwards, and vice-versa. Thus, the first and second tanks 20 and 24 are movable between an upper position and a lower position. When the first tank 20 is in the upper position, the second tank 24 is in the lower position. When the first tank 20 is in the lower position, the second tank 24 is in the upper position. The line 22 is interconnected to the shaft 60. More particularly, the line 22 is interconnected to the shaft 60 through the sheave 18, the locking means 63, the transmission 62, and the second coupling means 15, not necessarily in that order. The second coupling means 15 is positioned between the shaft 60 and the first and second tanks 20 and 24.

In the preferred embodiment, the first tank 20 and the second tank 24 are relatively large tanks containing one-thousand gallons or more of fluid. The fluid is water. As such, the relative movement of one tank with respect to the other tank imparts a huge amount of torque to the sheave 18, and in turn, to the generator 12. The transmission 62 reduces the torque to a level necessary for turning the generator 12. The line 22 can take various forms including chains, cables, wires, wire rope, gear chains and other mechanisms. Similarly, as used herein, the term "sheave" can apply to a wide variety of pulley-type structures, such as gears, sprockets, friction wheels, and other mechanisms which allow translation movement to be converted into rotation movement.

The base reservoir 28 connects to the elevated reservoir 26 through pipe 42. The pipe 42 has a one-way valve 44 thereon for ensuring that fluid flows only in a direction from the base reservoir 28 to the elevated reservoir 26. A pumping means 66 pumps fluid through the pipe 42 from the base reservoir 28 to the elevated reservoir 26. The pumping means 66 is electrically connected to the generator 12, as is shown by dashed line 40. The elevated reservoir 26 is supported by leg 19 that extends upwardly from the ground 37.

Figure 2:
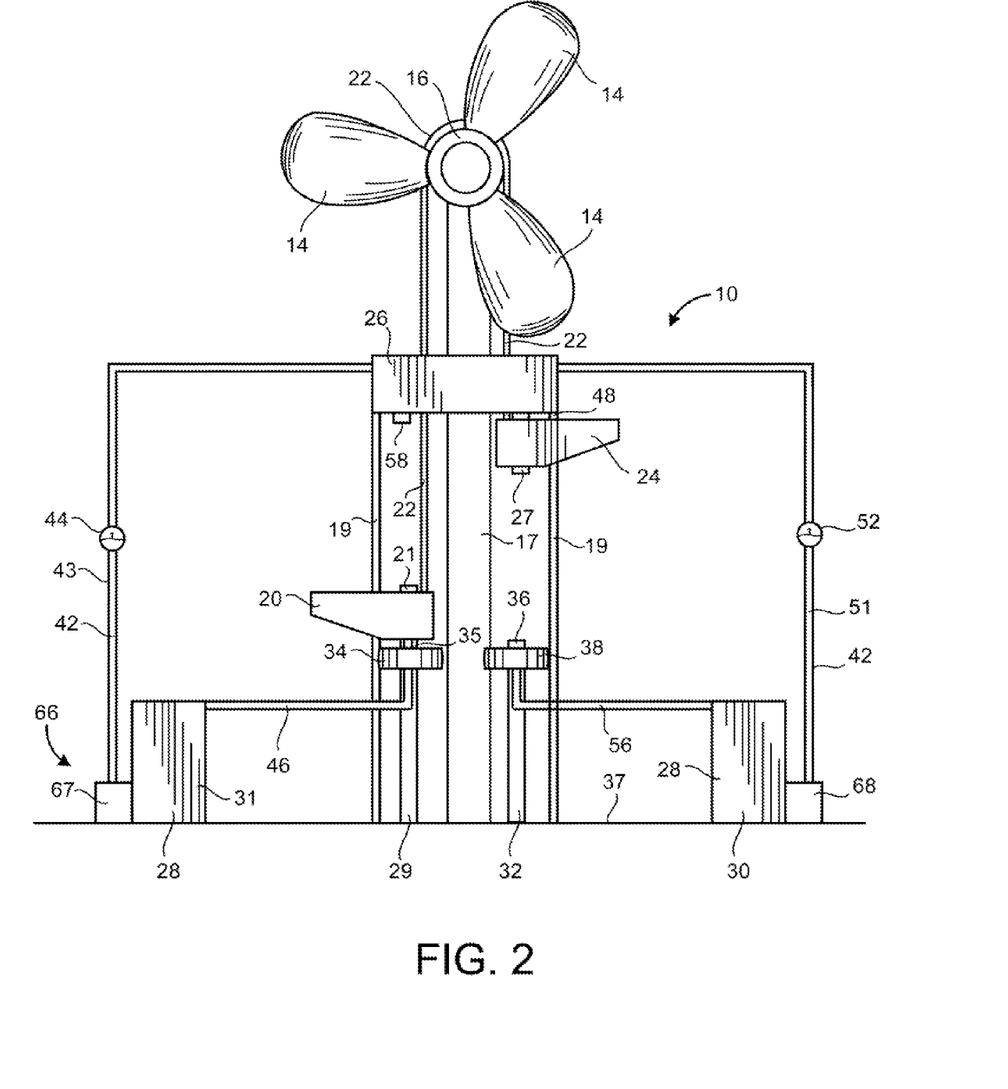
FIG. 2 shows a front elevational view of the preferred embodiment of the apparatus of the present invention, with the first tank in the lower position and the second tank in the upper position.

Referring to FIG. 2, there is shows a front elevational view of the preferred embodiment of the apparatus 10 of the present invention, with the first tank 20 is in the lower position and the second tank 24 in the upper position. An elevated reservoir 26 is elevated above the first and second tanks 20 and 24. The elevated reservoir 26 has a first discharge port 58 and a second discharge port 48. The second discharge port 48 can be seen as connected to the inlet 25 of the second tank 24 when the second tank 24 is in the upper position. The base reservoir 28 consists of a first base reservoir 31 and a second base reservoir 30. The first base reservoir 31 and the second base reservoir 30 are at an elevation below, or elevated below, the elevated reservoir 26. In the preferred embodiment, the first and second base reservoirs 31 and 30 rest on the ground 37. The base reservoir 28 also has a first discharge station 34 elevated above the first base reservoir 31. The first receiver port 35 is located on the first discharge station 34. More particularly, the first receiver port 35 is located on a top of the first discharge station 34. The base reservoir 28 has a second discharge station 38 elevated above the second base reservoir 30. The second receiver port 36 is located on the second discharge station 38. More particularly, the second receiver port 36 is located on a top of the second discharge station 38. The first receiver port 35 is connected to the outlet 23 of the first tank 20 when the first tank 20 is in the lower position. A first conduit 46 connects the first base reservoir 31 and the first discharge station 34. A second conduit 56 connects the second base reservoir 30 and the second discharge station 38. The first discharge station 34 is supported by member 29. The second discharge station 38 is supported by member 32.

The pipe 42 has a first pipe 43 and a second pipe 51. The first pipe 43 connects the first base reservoir 31 with the elevated reservoir 26. The second pipe 51 connects the second base reservoir 30 with the elevated reservoir 26. The pump means 66 has a first pump 67 and a second pump 68. The first pump 67 is positioned between the first base reservoir 31 and the first pipe 43. The second pump 68 is positioned between the second base reservoir 30 and the second pipe 51. The first pipe 43 has a one-way valve 44 that prevents flow from the elevated reservoir 26 to the first base reservoir 31. The second pipe 51 has a one-way valve 52 that prevent flow from the elevated reservoir 26 to the second base reservoir 30.

The first discharge station 34 is positioned below the first tank 20. The first discharge station 34 is at an elevation above, or elevated above, the first base reservoir 31. When the first tank 20 is in the lower position, as is shown in FIG. 2, the first tank 20 discharges any fluid in an interior volume thereof into the base reservoir 28. The outlet 23 of the first tank 20 engages the first receiver port 35 of the first discharge station 34 when in the lower position. If there is no fluid in the interior volume of the first tank 20, then no fluid discharges from the first tank 20 into the base reservoir 28. The fluid travels from the interior volume of the first tank 20, through the outlet of the first tank 20 which is connected to the first receiver port 35, into the first discharge station 34, through the first conduit 46, and into the first base reservoir 31. The first conduit 46 is connected to a top of the first base reservoir 31 to ensure that fluid flows from the first tank 20 to the first base reservoir 31 by action of gravity.

The inlet and outlet 21 and 23 of the first tank 20, the inlet and outlet 25 and 27 of the second tank 24, the first and second discharge ports 58 and 48 of the elevated reservoir 26, and the first and second receiver ports 35 and 36 of the base reservoir 28 are all connections suitable for quickly connecting and disconnecting together as herein described. These connections can be of a mechanical-type connection with mechanisms, such as a ball and springs, that ensure that the connection is closed so that no fluid passed therethrough when the connection is not mated with another connection. Preferably, these connections are of a quick connect/disconnect fittings design that is commonly used in the energy industry and other industries.

In the lower position, the outlet of the first tank 24 to immediately connects to the first discharge station 34. The weight of the first tank 20 is very large (in view of the fact that it contains over a thousand gallons of fluid, such as water). One-way valves 44 and 52 are placed along the first and second pipes 43 and 52 so as to cause the pumping action associated with the first and second pumps 67 and 68 to only deliver fluid upwardly toward the elevated reservoir 26.

The second tank 24 is illustrated in the upper position. The elevated reservoir 26 includes a second discharge port 48 that engages the inlet 25 of the second tank 24 when the second tank 24 is in its upper position. Because of the nature of the quick connect/disconnect inlet 25 and second discharge port 48, the fluid within the elevated reservoir 26 can drain by action of gravity into the interior volume of the second tank 24.

When apparatus 10 starts, the second tank 24 is in the upper position. The first coupling means 13 is in the coupled position so that the shaft 60 rotates with the blades 14 and hub 16. The second coupling means 15 is decoupled so that the transmission 62, sheave 18, line 22, and thus the first and second tanks 20 and 24 do not rotate with the blades 14 and hub. The second tank 24 is initially generally empty of fluid, as is the elevated reservoir 26. To get the apparatus going, one must put a fluid, such as water, in the first and second base reservoirs 31 and 30 of the base reservoir 28. As the wind passing by the apparatus 10 during peak wind conditions rotates the blades 14 and hub 16, electricity is generated in the generator 12. Some of this electricity is passed to the first and second pumps 67 and 68, which pump fluid in the first and second base reservoirs 31 and 30 to the elevated reservoir 26.

Because the second tank 24 and elevated 26 reservoir are connected initially, the fluid passes from the elevated reservoir 26 into the interior volume of the second tank 24 until the second tank 24 is full of fluid. Fluid passes as long as the generator 12 runs the pumps 67 and 68. The weight of the filled second tank 24 overcomes the strength of the connection between the inlet 25 of the second tank 24 and the first discharge port 58 of the elevated reservoir 26. However, the connection between inlet 25 and the first discharge port 58 remains intact until the blades 14 and hub 16 become stationary.

When the blades 14 and hub 16 no longer rotate, the sensor means 11 senses the condition, and the locking means 63 moves from a locked position to an unlocked position. The sensor means 11 also sends a signal to the first coupling means 13 and second coupling means 15 that the blades 14 and hub 16 are stationary. The first coupling means 13 moves from the coupled position to the decoupled position so that the shaft 60 does not rotate the blades 14 and hub 16 and waste any energy generated by the tanks 20 and 24 due to extra torque on shaft 60. The second coupling means 15 moves from the decoupled position to the coupled position so that the oscillation of the tanks 20 and 24 on line 22 can rotate shaft 60 of generator 12 so as to generate electricity when the blades 14 and hub 16 are stationary during non-peak wind conditions. The pumps 67 and 68 can optionally run on the electricity generated by the oscillation of the tanks 20 and 24 so as to pump fluid from the base reservoir 28 to the elevated reservoir 26, but this would reduce power output during non-peak wind conditions.

Figure 3:
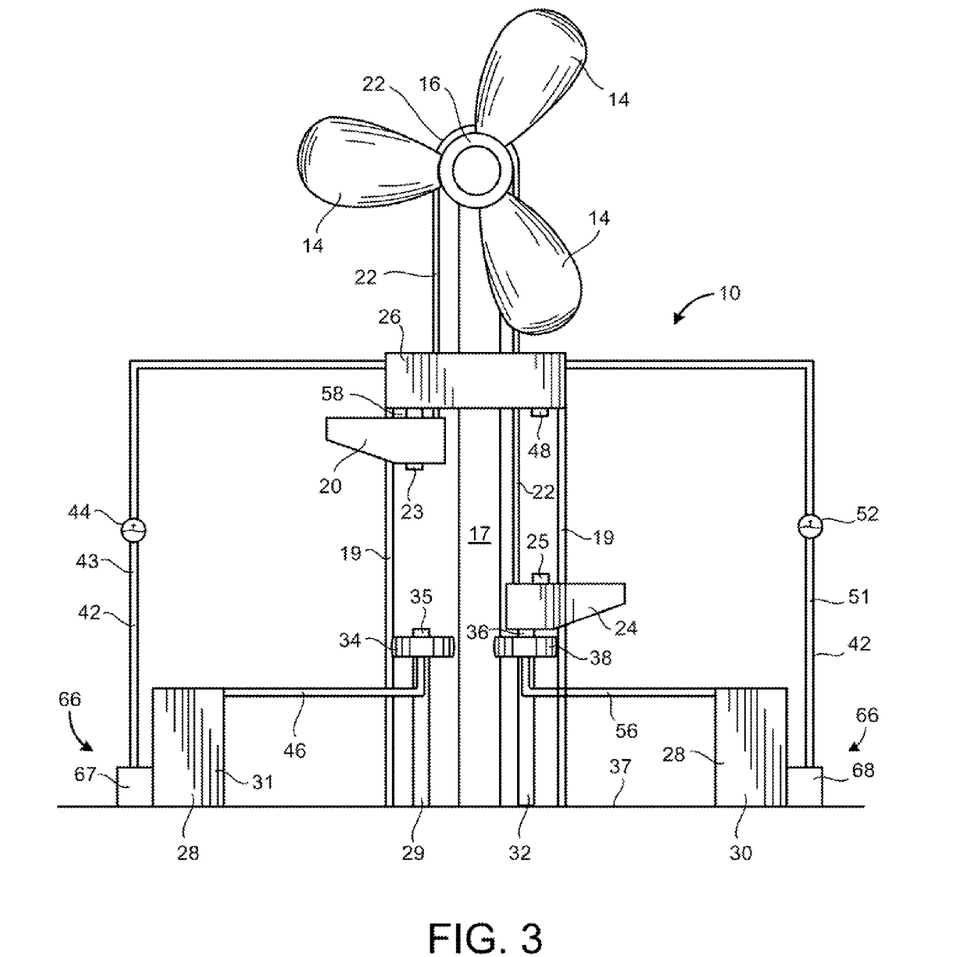
FIG. 3 shows a front elevational view of the preferred embodiment of the apparatus of the present invention, with the first tank in the upper position and the second tank in the lower position.

Referring to FIG. 3, there is shown a front elevational view of the preferred embodiment of the apparatus 10 of the present invention, with the first tank 20 in the upper position and the second tank 24 in the lower position. The first discharge port 34 is connected to the inlet 21 of the first tank 20 when the first tank 20 is in the upper position. The second receiver port 36 is connected to the outlet 27 of the second tank 24 when the second tank 24 is in the lower position. The second discharge station 38 is positioned below the second tank 24. The second tank 24 discharges fluid from an interior volume when in the lower position. The outlet 27 of the second tank 24 engages the second receiver port 36 when in the lower position. The second discharge station 38 is at an elevation above, or elevated above, the second base reservoir 30.

The second tank 24 was filled with fluid, and the second tank 24 fell downwardly by action of gravity. This caused the line 22 to move on the sheave 18 and pull the empty first tank 20 to the upper position, with the second tank 24 in the lower position, as shown in FIG. 3. When the second tank 24 is in the lower position, the outlet 27 of the second tank connects with the second receiver port 36 of the second base reservoir 30 of the base reservoir 28 so as to allow any fluid within the tank 24 to drain into the second base reservoir 30. Fluid in the second tank 24 flows, by action of gravity, through the outlet 27 and second receiver port 36, through the second conduit 56, and into the second base reservoir 30. The conduit 56 connects to a top of the second base reservoir 30. Fluid falls by action of gravity from the elevated reservoir 26 into the first tank 20. As the first tank 20 fills with fluid, the weight of the tank 20 overcomes the strength of the connection between the first discharge port 58 and the inlet 21 of the first tank 20. The first tank 20 then falls from the upper position to the lower position, pulling the second tank 24 upwards from the lower position to the upper position. The first and second tanks 20 and 24 continue to be filled and drained as described above so as to oscillate between the upper and lower positions and so as to oscillate line 22 on sheave 22. The turning of the sheave 22 turns the transmission 62, which rotates or turns the shaft 60 in the generator 12 so as to generate electricity. The rising and falling of the tanks 20 and 24 continues until the elevated reservoir 26 empties of fluid.

When peak wind conditions return, the blades 14 and hub 16 begin to rotate. The sensor means 11 is operably connected to the first and second coupling means 13 and 15. The sensor means 11 senses the rotation and sends a signal to the first coupling means 13, the second coupling means 15, and the locking means 63. The first coupling means 13 moves from the decoupled position to the coupled position. The second coupling means 15 moves from the coupled position to the decoupled position, and the locking means 63 moves from the unlocked position to the locked position so as to stop the tanks 20 and 24 from oscillating on line 22. The second coupling means 15 decouples so that the energy created by the rotation of shaft 60, blades 14, and hub 16 is not lost in the torque needed to turn the heavy tanks 20 and 24 (which would waste energy that could be converted to electricity).

The first and second pumps 67 and 68 pump fluid from the base reservoir 28 to the elevated reservoir 26 when the first coupling mechanism 13 is in the coupled position, when the second coupling mechanism 15 is in the decoupled position, and when the locking means 63 is in the locked position. The blades 14 and hub 16 rotate when the first coupling mechanism 13 is in the coupled position, when the second coupling mechanism 15 is in the decoupled position, and when the locking means 63 is in the locked position.

The apparatus 10 has a controlling means 41 operably connected to the pumping means 66. The controlling means 41 controls the pumping means 66. For example, the controlling means 41 can have first pump 67 can operate (given the generator 12 makes electricity) while the second tank 24 is in the upper position, and the second pump 68 can operate while the first tank 24 is in the upper position. The controlling means 41 can control the pumping means 66 in any other suitable way. The controlling means 41 can also operably connected to the first coupling means 13 and to the second coupling means 15 and to the locking means 63 and to the sensor means 11. The controlling means 41 controls the first coupling means 13 and the second coupling means 15 and the locking means 63. For example, the sensor means 11 can send signals to the controlling means 41, which then controls the various positions of the first and second coupling means 13 and 15 and the locking means 63. The controlling means 41 can be powered by the generator 12. The first and second coupling means 13 and 15 and locking means 63 can be entirely mechanical so as to automatically couple and decouple according to the rotation of blades 14 and hub 16 without the need of a controlling means 41. In this scenario, only the pumping means 66 is controlled by the controlling means 41.

Figure 4:
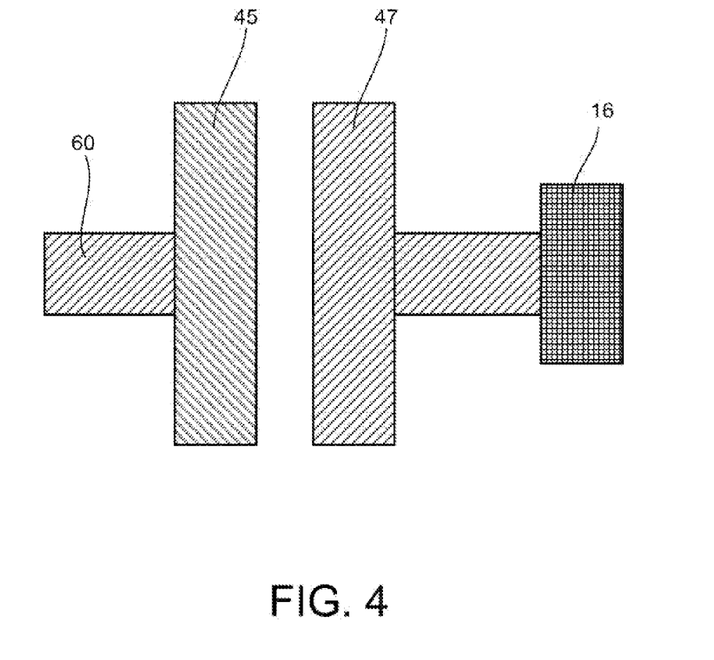
FIG. 4 shows an isolated side elevation view of the first coupling means of the present invention.

Referring to FIG. 4, there is shown an isolated side elevational view of the first coupling means 13 of the present invention in the decoupled position. The first coupling means 13 has a first member 47 connected to the hub 16 and a second member 45 connected to the shaft 60. The first member 47 and second member 45 are in the decoupled position when the blades 14 and hub 16 are stationary. There is a space between the first and second members 47 and 45 in the decoupled position. The first member 47 and second member 45 are in the coupled position when the blades 14 and 16 rotate. The first and second members 47 and 45 are adjacent to each other in the coupled position.

Wind turns the blades 14 and hub 16, and consequently, the generator 12 so as to generate electricity from wind energy. The electricity is used to power pumping means 66 so as to pump fluid from the base reservoir 28 to the elevated reservoir 26. The electrical energy is converted to the potential energy of the fluid in the elevated reservoir 26. The apparatus 10 of the present invention, through the storage of fluid in the elevated reservoir 26 effective converts wind energy to potential energy during peak wind conditions for use during non-peak wind conditions.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. An apparatus for storing and using wind energy comprising:
   a hub;
   a plurality of blades extending radially outwardly from said hub;
   a shaft interconnected to said hub;
   a generator connected to said shaft, said shaft extending through said generator, said shaft extending outwardly of an end of said generator opposite said hub;
   a first coupling means for coupling and decoupling said shaft from said hub, said first coupling means positioned between said shaft and said hub;
   a first tank having an inlet and an outlet;
   a second tank having an inlet and an outlet;
   a line connecting said first tank and said second tank, said line being interconnected to said shaft, each of said first and second tanks being movable between an upper position and a lower position, said first tank being in said upper position when said second tank is in said lower position, said second tank being in said upper position when said first tank is in said lower position;
   a second coupling means for coupling and decoupling said shaft from said line, said second coupling means positioned between said shaft and said first and second tanks;
   an elevated reservoir having a first discharge port and a second discharge port, said first discharge port being connected to said inlet of said first tank when said first tank is in said upper position, said second discharge port being connected to said inlet of said second tank when said second tank is in said upper position;
   a base reservoir having a first receiver port and a second receiver port, said first receiver port being connected to said outlet of said first tank when said first tank is in said lower position, said second receiver port being connected to said outlet of said second tank when said second tank is in said lower position; and
   a pumping means for pumping a fluid from said base reservoir to said elevated reservoir, said pumping means being electrically connected to said generator.

2. The apparatus of claim 1, further comprising:
   a transmission interconnected to said shaft between said line and said generator; and
   a sheave positioned on a side of said transmission opposite said shaft, said line extending around said sheave.

3. The apparatus of claim 2, each of said first and second coupling means having a coupled position and a decoupled position, said first coupling means being in said coupled position when said second coupling means is in said decoupled position, said first coupling means being in said decoupled position when said second coupling means is in said coupled position.

4. The apparatus of claim 3, said first coupling means comprising:
   a first member connected to said hub; and
   a second member connected to said shaft, said first member and second member being in said coupled position when said plurality of blades and said hub rotate, said first member and said second member being in said decoupled position when said plurality of blades and said hub are stationary.

5. The apparatus of claim 3, said second coupling means being a clutch operatively connected to said transmission, said clutch being in said decoupled position when said plurality of blades and said hub rotate, said clutch being in said coupled position when said plurality of blades and said hub are stationary.

6. The apparatus of claim 3, further comprising:
a pipe connecting said base reservoir with said elevated reservoir, said pumping means for pumping the fluid through said pipe from said base reservoir to said elevated reservoir.

7. The apparatus of claim 6, said base reservoir comprising:
a first base reservoir;
a second base reservoir;
a first discharge station elevated above said first base reservoir, said first receiver port located on said first discharge station;
a second discharge station elevated above said second base reservoir, said second receiver port located on said second discharge station;
a first conduit connecting said first base reservoir and said first discharge station; and
a second conduit connecting said second base reservoir and said second discharge station.

8. The apparatus of claim 7, said pipe comprising:
a first pipe connecting said first base reservoir with said elevated reservoir; and
a second pipe connected said second base reservoir with said elevated reservoir.

9. The apparatus of claim 8, said pumping means comprising:
a first pump positioned between said first base reservoir and said first pipe; and
a second pump positioned between said second base reservoir and said second pipe.

10. The apparatus of claim 8, said first pipe having a one-way valve positioned thereon, said second pipe having a one-way valve positioned thereon.

11. The apparatus of claim 7, said first discharge station positioned below said first tank, said second discharge station positioned below said second tank, said first tank discharging the fluid from an interior volume when in said lower position, said second tank discharging the fluid from an interior volume when in said lower position.

12. The apparatus of claim 11, said outlet of said first tank engaging said first receiver port of said first discharge station when in said lower position, said outlet of said second tank engaging said second receiver port of said second discharge station when in said lower position.

13. The apparatus of claim 12, said first discharge station being elevated above said first base reservoir, said second discharge station being elevated above said second base reservoir.

14. The apparatus of claim 3, said first base reservoir being elevated below said elevated reservoir, said second base reservoir being elevated below said elevated reservoir.

15. The apparatus of claim 2, said transmission being a variable-drive transmission.

16. The apparatus of claim 3, further comprising:
a locking means for preventing a rotation of said line around said sheave when said first coupling means is in said coupled position and said second coupling means is in said decoupled position, said locking means being positioned between said second coupling means and said sheave; and
a sensor means for detecting a rotation of said plurality of blades and said hub, said sensor means being operatively connected to said locking means.

17. The apparatus of claim 16, said locking means having a locked position and an unlocked position, said locking means for moving from said unlocked position to said locked position after said sensor means detects the rotation of said plurality of blades and said hub.

18. The apparatus of claim 17, said sensor means being operably connected to said first and second coupling means, said sensor means for sending a signal to said first and second coupling means upon detecting a rotation of said blades.

19. The apparatus of claim 16, further comprising:
a controlling means operably connected to said first coupling means and to said second coupling means and to said locking means, said controlling means for controlling said first coupling means and said second coupling means and said locking means.

20. The apparatus of claim 19, said controlling means operably connected to said sensor means, said controlling means for communicating with said sensor means.

* * * * *